United States Patent [19]
Maracle

[11] 3,807,150
[45] Apr. 30, 1974

[54] ABSOLUTE FILTER PACK STRUCTURE HAVING A TOROIDAL SECTION

[75] Inventor: Clarence H. Maracle, La Puente, Calif.

[73] Assignee: Hepa Corporation, South El Monte, Calif.

[22] Filed: Feb. 28, 1972

[21] Appl. No.: 229,743

[52] U.S. Cl............... 55/498, 55/500, 55/521, 55/527, 210/493
[51] Int. Cl............................................ B01d 27/06
[58] Field of Search............ 55/498, 500, 521, 527; 210/493

[56] References Cited
UNITED STATES PATENTS

| | | | |
|---|---|---|---|
| 2,884,091 | 4/1959 | Baldwin | 55/500 |
| 3,279,615 | 10/1966 | Stokes | 55/498 |
| 3,279,616 | 10/1966 | Bourdale | 210/487 |
| 3,498,032 | 3/1970 | Scott | 55/498 |
| 3,696,592 | 10/1972 | Engleman | 55/500 |

*Primary Examiner*—Bernard Nozick
*Attorney, Agent, or Firm*—Louis J. Bachand

[57] ABSTRACT

Hepa filter pack structure having a toroidal section. Certain of the separators normally used to space adjacent filter pleats are reduced in width to reduce the circular spacing of the pleat inner ends to provide a toroidal section in a practical size.

12 Claims, 5 Drawing Figures

ABSOLUTE FILTER PACK STRUCTURE HAVING A TOROIDAL SECTION

BACKGROUND OF THE INVENTION

This invention has to do with Hepa filter packs and, more particularly, with Hepa filter pack structure enabling compact toroidal sections. Rectangular "Hepa" high efficiency particulate air filter packs have long been know. See Federal Standard 209A. Some basically rectangular filter packs have been slightly curved to a radius for specific applications. See U.S. Pat. No. 3,498,032 to Scott where a plural segment circular filter is depicted, having a radius of several feet.

Obviously such sizes of circular Hepa filters are of limited applicability. There is need for small filters capable of radial air flow in confined places, e.g., in computer cooling air flow applications.

PRIOR ART

Hepa filter packs in rectangular configurations comprise a generally rectangular frame and a filter element supported herein. The filter element is formed of a transversely pleated, longitudinally extended fiberglass web which is the actual filtering material and a plurality of like size separators, such as corrugated aluminum sheet, between adjacent pleats. The separators provide a minimum interpleat spacing corresponding to the separator width for air flow through the filter element. This known structure can be curved, but only to an impractically large radius, for most applications.

Accordingly, it is a major objective of the present invention to provide Hepa filter pack having structural features enabling a curved filter configuration, about a relatively small radius, e.g., 2 inches. Other objectives and improvements will be noted from the ensuing description.

SUMMARY OF THE INVENTION

In accordance with the invention, in general, the foregoing objective is realized by the employment of differential spacing of the plural pleats about a center axis, to enable closer spacing of the inner pleat ends and an interior circle within the filter of quite small dimension.

More particularly, there is provided in accordance with the invention, in Hepa filter pack structure comprising a frame and a filter element formed of a transversely pleated, longitudinally extended fiberglass web and separators between adjacent pleats providing a minimum interpleat spacing corresponding to the separator width, the improvement comprising a toroidal section in the filter element, the section including web pleats disposed in radial planes which intersect a common central axis and reduced width portions adjacent the axis in certain of the separators for reduced circular spacing of the inner ends of the pleats, the filter element being supported by the frame for radial air passage through the toroidal section. The separators may each be elongated metal strips having transverse corrugations of a size to define the separator width, the separators being arranged to provide plural radially extending air flow passages between adjacent pleats. The corrugations of an individual separator strip may be uniform throughout the strip length. The frame may include upper and lower wall members adapted to channel air flow radially through the filter element section.

In certain embodiments, alternate ones of the separators are reduced in corrugation depth between the pleat inner ends. The reduced depth separators may have a depth equal to from 10 to 50 percent of the other separators. The alternate separators may have relative inward and outward exposure, the reduced width separators preferably having the inward exposure. In other embodiments, certain of the reduced width separators will have an inner terminus outward of the pleat inner ends whereby the inner end portions of pleats separated thereby abut each other adjacent the axis.

The invention further contemplates a toroidal filter pack comprising: a toroidal filter element formed of a transversely pleated, longitudinally extended fiberglass web circularly disposed about a central axis to have its pleats in plural radial planes intersecting the axis, and separators between adjacent pleats providing a minimum interpleat spacing corresponding to the separator width, certain of the separators having reduced width portions between the pleat inner ends adjacent the axis for reduced circular spacing of the pleat inner ends; and a circularly extended frame means secured to the pleats and separators in edge supporting relation. The frame means may comprise upper and lower circular frame members disposed normally to the axis; the members being air impervious and fastened to the top and bottom edges respectively of the pleats and separators to channel air flow radially through the filter element.

As in the previous embodiment, the separators may be each elongated metal strips having transverse corrugations of a size to define the separator width, the corrugations being preferably uniform throughout an individual strip length, and circularly alternate ones of the separators being uniformly reduced in width, the strip corrugations being arranged in the filter element to provide plural radially extending air flow passages between the adjacent pleats.

BRIEF DESCRIPTION OF THE DRAWINGS

The invention will now be further described as to certain illustrative embodiments, in connection with the attached drawing in which.

DESCRIPTION OF THE PREFERRED EMBODIMENTS

Figure 1:
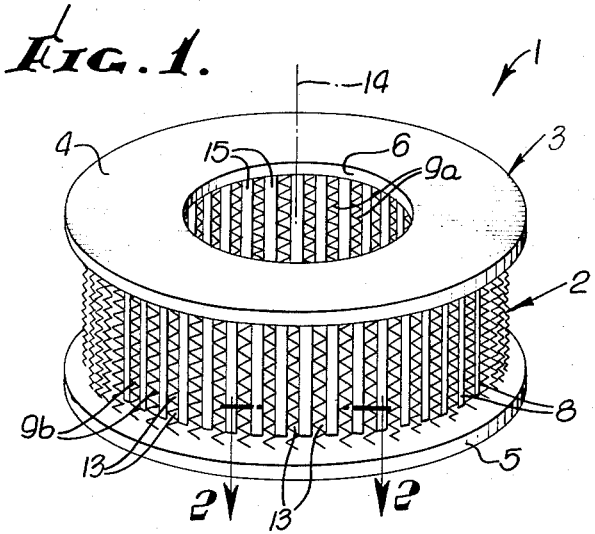
FIG. 1 is a perspective view of a toroidal Hepa filter pack in which the reduced width separators alternate regularly with normal width separator structure according to the invention.
Figure 2:
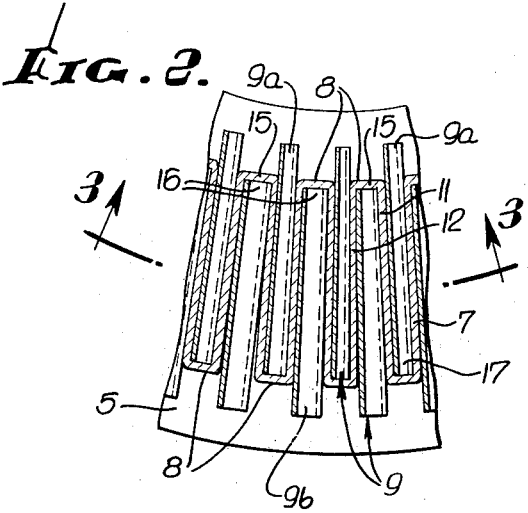
FIG. 2 is an enlarged fragmentary sectional view thereof taken on line 2-2 in FIG. 1.
Figure 3:
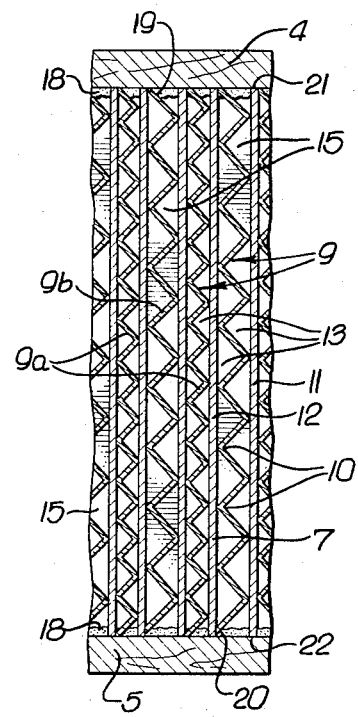
FIG. 3 is a vertical sectional view thereof taken on line 3—3 in FIG. 2.

With reference to the drawings and particularly FIGS. 1, 2 and 3, a toroidal filter pack structure according to the invention is shown at 1 in FIG. 1. The structure 1 may be of any size but advantageously with the differential separator sizing of the invention, the structure may be quite small, e.g., approximately 9.5 inches in diameter, 4 inches in height and have a center aperture of about 5 inches. Smaller or larger units may be constructed using the principles of the invention.

The structure 1 includes a filter element 2 and a frame 3 comprising upper circular frame member 4 and lower circular frame member 5, each being centrally apertured at 6. The filter element is formed of an elongated fiberglass web 7 having a porosity enabling the filtration from an air stream of submicron particles. As best shown in FIG. 2, the web 7 is pleated into multiple transverse pleats 8, successive pleats being spaced by separators 9, in a pattern to be described below and the assembly axially pressed to a reduced dimension. The separators 9 are elongated strips of light metal, such as aluminum, having transverse corrugations 10. Other separators may be used, e.g., wood separators or plastic, providing the air permeability of the filter element 2 is not unduly impaired. Corrugated separators 9 are inserted between successive web pleat walls, 11, 12 (FIG. 2) with the corrugation 10 alined to define plural air passing channels 13 between the inside and outside of the filter element 2, as best seen in FIG. 3.

Thus far described, the filter 1 is largely conventional. The present invention departs from previous practices in constructing the filter element 2 to enable conforming the element about a relatively small radius. Referring particularly to FIG. 2, the alternate separators 9a, between successive opposed pairs of pleats 8, differ in width from the other separators 9b. This difference in separator width correspondingly varies in spacing of the pleats 8 as shown.

The Hepa filter pack structures of this invention have a toroidal section or may be completely toroidal as shown in FIG. 1. In either case, the pleats 8 of the web 7, and the separators 9 therebetween, assume a radial disposition relative to a central axis 14 of the toroid, with each pleat and separator lying in a different radial plane, and all planes intersecting and parallel to the central axis.

The relatively closer spacing of the inner ends 15 of the pleats 8 required to have a toroidal section is provided for in the present invention by the mentioned alternation of different width separators 9a, 9b without sacrificing air throughput or unduly increasing pressure drop across the filter.

As shown in FIG. 2, the separators 9a, 9b have inward or outward projection respectively, relative to the central axis 14 and are of constant width throughout their length by virtue of uniformity of corrugations. The wider separators 9b are bridged by the web 7 at their inner ends 16 and the narrower separators bridged by the web at their outer ends 17.

In general, the ratio of the wider separator 9b width to the narrower separator 9a width can range between 10/1 and 2/1 and preferably between 6/1 and 4/1, or expressed in percentage terms, the reduced width or narrower separators 9a may have a width equal to between 10 percent and 50 percent of the normal or greater width separators, or preferably from 25 percent to about 10 percent thereof. In absolute terms, for the toroidal filter element of about 9.5 inches diameter above described, the relatively wider separators 9b may have an overall width (corrugation amplitude) of five thirty-seconds inch and the relatively narrower separators 9a may have an overall width or corrugation amplitude of one thirty-second inch for a 5/1 width ratio therebetween. Other sizes of filter packs 1 may employ wider separators of one inch width or as little as four thirty-seconds inch in width. The lower limit on the width of the narrower separators 9a is imposed by air flow requirements and may be as small as is consistent with obtaining required minimum air flow under use conditions.

Figure 5:
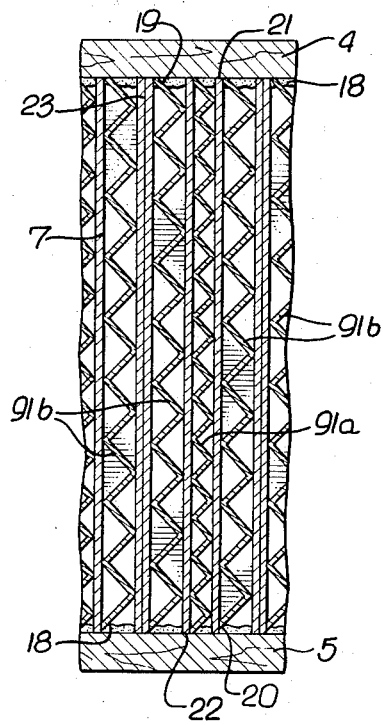
FIG. 5 is view like FIG. 3, and of an alternative embodiment in which the reduced and normal width separators are irregularly arranged.

The arrangement of different width separators 9a, 9b described enables closer spacing of the pleat inner ends 15 which then define a smaller interior circle about the central axis and provide a toroidal filter of conveniently small dimension. Strict alternation of the separators 9a, 9b by width is not required. As shown in FIG. 5, the reduced width separators 91a in filter 2 may be used in alternation with two normal width separators 91b therebetween and some reduced with separators may be omitted as at 23; or any other arrangement, regularly or irregularly repeating may be used provided sufficient width is taken out of the inner pleat end 15 spacing to enable close conformation about axis 14.

Figure 4:
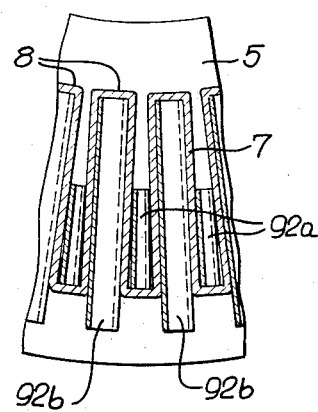
FIG. 4 is view like FIG. 2 and of an alternative embodiment.

In certain embodiments, some or all of the reduced width separators may be terminated short of the inner pleat ends to enable absolute minimum spacing where air flow requirements permit. Thus as shown in FIG. 4, reduced width separators 92a are about half as great in length or radial extend as the normal width separators 92b.

This result may be achieved while having full length of all separators by reducing in width at least that portion of separators 9a, 9b which lies between the pleat inner ends 15.

In constructing the toroidal filter packs of the invention, the fiberglass web 7 is pleated and the separators 9a, 9b inserted in the desired pattern, alternation or whatever, permitting the needed inner pleat end spacing. The assembly of pleats and separators is axially compressed and formed into a radial array with the opposite assembly ends being abutted. The assembly is supported in this arrangement by the frame members 4, 5 which are glued to the top and bottom edges of the pleats and separators. See FIGS. 3 and 5 where the wooden frame members 4, 5 are glued at 18 to the separator top and bottom edges 19, 20 and to the pleat 8 top and bottom edges 21, 22, the separators 9a, 9b, 91a, 91b being corrugated and alined to provide plural radially disposed air passages 13 through the filter assembly, the frame members 4, 5 serving to channel air flow through the filter pleats.

I claim:

1. In Hepa filter pack structure comprising a frame having an upper frame member and a lower frame member, and between said members a filter element formed of a transversely pleated, longitudinally extended fiberglass web and corrugated separators between adjacent pleats providing a minimum interpleat spacing corresponding to the separator corrugation depth, said upper and lower edges of said pleats engaging said upper and lower frame members respectively, the improvement comprising a toroidal section in said filter element having an inner circumference and an outer circumference, said section including said web pleats disposed in radial planes which commonly intersect the section axis, and said separators being radially disposed and extending from said inner circumference to said outer circumference, alternate ones of said separators having reduced corrugation depth at said inner circumference to reduce circular spacing of the inner ends of the pleats, said filter element section being supported above and below by said upper and lower frame members respectively, for radial air passage through said toroidal section.

2. Hepa filter pack structure according to claim 1 in which said frame includes upper and lower wall members adapted to channel air flow radially through said filter element section.

3. Hepa filter pack structure according to claim 1 in which said separators are each elongated metal strips, said corrugations being arranged to provide plural radially extending air flow passages between adjacent pleats.

4. Hepa filter pack structure according to claim 3 in which corrugations of each individual strip are uniform throughout the strip length.

5. Hepa filter pack structure according to claim 1 in which the reduced depth separators have a depth equal to from 10 to 50 percent of the other separators.

6. Hepa filter pack structure according to claim 5 in which alternate separators have relative inward and outward exposure and said reduced depth separators have inward exposure.

7. A toroidal Hepa filter pack structure comprising: a toroidal filter element formed of a transversely pleated, longitudinally extended fiberglass web circularly disposed about a central axis to have its pleats in plural radial planes intersecting said axis, and corrugated separators extending between the element inner circumference and the element outer circumference and radially of the element central axis between adjacent pleats providing a minimum interpleat spacing corresponding to the separator corrugation depth, of alternate ones of said separators having reduced corrugation depth at the element inner circumference for reduced circular spacing of said pleat inner ends; and a circularly extended frame means secured to said pleats and separators in edge supporting relation.

8. Toroidal Hepa filter pack structure according to claim 7 in which said separators are each elongated metal strips arranged to provide plural radially extending air flow passages between adjacent pleats.

9. Toroidal Hepa filter pack structure according to claim 8 in which corrugations of each individual strip are uniform throughout the strip length and circularly alternate ones of said separators are uniformly reduced in width.

10. Toroidal Hepa filter pack according to claim 9 in which alternate separators have relative inward and outward exposure, said reduced width separators having the inward exposure.

11. Toroidal Hepa filter pack structure according to claim 12 in which said frame means comprises upper and lower circular frame members disposed normally to said axis, said members being air impervious and fastened to the top and bottom edges respectively of said pleats and separators, to channel air flow radially through said filter element.

12. Toroidal Hepa filter pack according to claim 11 in which said reduced width separators have a width equal to from 10 to 25 percent of the alternate separators.

* * * * *

UNITED STATES PATENT OFFICE
CERTIFICATE OF CORRECTION

Patent No. 3,807,150      Dated April 30, 1974

Inventor(s) Clarence H. Maracle

It is certified that error appears in the above-identified patent and that said Letters Patent are hereby corrected as shown below:

Column 6, line 1 should read -- corresponding to the separator corrugation depth, --

Signed and sealed this 10th day of September 1974.

(SEAL)
Attest:

McCOY M. GIBSON, JR.
Attesting Officer

C. MARSHALL DANN
Commissioner of Patents